United States Patent
Brockwell et al.

(10) Patent No.: US 11,929,051 B2
(45) Date of Patent: Mar. 12, 2024

(54) ENVIRONMENT AWARENESS SYSTEM FOR EXPERIENCING AN ENVIRONMENT THROUGH MUSIC

(71) Applicant: General Motors LLC, Detroit, MI (US)

(72) Inventors: Eric W. Brockwell, Royal Oak, MI (US); Benjamin J. Cool, Canton, MI (US); Babak Makkinejad, Troy, MI (US); Daniel E. Rudman, West Bloomfield, MI (US)

(73) Assignee: General Motors LLC, Detroit, MI (US)

( * ) Notice: Subject to any disclaimer, the term of this patent is extended or adjusted under 35 U.S.C. 154(b) by 781 days.

(21) Appl. No.: 17/060,976

(22) Filed: Oct. 1, 2020

(65) Prior Publication Data
US 2022/0108675 A1    Apr. 7, 2022

(51) Int. Cl.
G10H 1/00 (2006.01)
G06F 3/16 (2006.01)
G10H 1/46 (2006.01)

(52) U.S. Cl.
CPC .......... *G10H 1/0025* (2013.01); *G06F 3/165* (2013.01); *G10H 1/46* (2013.01);
(Continued)

(58) Field of Classification Search
CPC .. G10H 1/0025; G10H 1/46; G10H 2210/111; G10H 2210/151;
(Continued)

(56) References Cited

U.S. PATENT DOCUMENTS

| 11,705,096 B2 * | 7/2023 | Huang ................... G06N 20/00 84/609 |
| 2008/0202323 A1 * | 8/2008 | Isozaki ................ G10H 1/0008 84/636 |

(Continued)

FOREIGN PATENT DOCUMENTS

| EP | 1930877 A2 * | 6/2008 | ........... G10H 1/0008 |
| JP | 2005111261 A * | 4/2005 | ............ A61M 21/02 |

(Continued)

OTHER PUBLICATIONS

MIT News On Campus and Around the World, "Translating proteins into music, and back—By turning molecular structures into sounds, researchers gain insight into protein strucutres and create new variations," by David L. Chandler, Jun. 26, 2019 (https://news.mit.edu/2019/translating-proteins-music-0626).

(Continued)

*Primary Examiner* — Christina M Schreiber

(57) ABSTRACT

An environment awareness system includes a memory and first and second modules. The memory is configured to store environmental data, one or more music composition templates, and one or more maps, where the environmental data is indicative of at least one of a state, condition, or change in an environment in which the environment awareness system is located. The first module is configured to receive and store the environmental data in the memory. The second module is configured to: based on the one or more music composition templates and the one or more maps, convert the environmental data to a music signal including modifying variables in the one or more music composition templates based on the environmental data; and based on the music signal, play out a musical composition via an audio system to audibly indicate the at least one of the state, condition, or change in the environment.

20 Claims, 8 Drawing Sheets

(52) U.S. Cl.
CPC .. *G10H 2210/111* (2013.01); *G10H 2210/151* (2013.01); *G10H 2210/325* (2013.01); *G10H 2210/391* (2013.01); *G10H 2210/571* (2013.01); *G10H 2220/091* (2013.01)

(58) Field of Classification Search
CPC ....... G10H 2210/325; G10H 2210/391; G10H 2210/571; G10H 2220/091; G06F 3/165
USPC .......................................................... 84/609
See application file for complete search history.

(56) References Cited

U.S. PATENT DOCUMENTS

| | | | | |
|---|---|---|---|---|
| 2016/0217702 | A1* | 7/2016 | Caldwell-Edmonds | G09B 15/026 |
| 2017/0263227 | A1* | 9/2017 | Silverstein | G10H 1/368 |
| 2020/0243055 | A1* | 7/2020 | Grace | G09B 5/04 |
| 2021/0158790 | A1* | 5/2021 | Huang | G06N 20/00 |
| 2021/0248983 | A1* | 8/2021 | Balassanian | G10H 1/0066 |
| 2021/0350777 | A1* | 11/2021 | Nordin | G10H 1/0025 |
| 2022/0108675 | A1* | 4/2022 | Brockwell | G10H 1/46 |
| 2022/0114993 | A1* | 4/2022 | Nordin | G10H 1/0033 |
| 2023/0053899 | A1* | 2/2023 | Minakata | G10H 1/38 |

FOREIGN PATENT DOCUMENTS

| | | | | |
|---|---|---|---|---|
| JP | 2008242037 A | * | 10/2008 | G10H 1/0025 |
| WO | WO-2005028013 A1 | * | 3/2005 | A61M 21/02 |

OTHER PUBLICATIONS

Genome Biology, 2007; 8(5); 405, "Conversion of amino-acid sequence in proteins to classical music: search for auditory patterns," by Rie Takahashi and Jeffrey H. Miller, Published online May 3, 2007, doi 10.1186/GB-2007-8-5-405 (https://www.ncbi.nlm.nih.gov/pmc/articles/PMC1929127/).

IBM Think Blog, "Making 'Cognitive Music' with IBM Watson," by Lisa Amini, Ph.D., Oct. 24, 2016(https://www.ibm.com/blogs/think/2016/10/watson-music/).

Music Animation Machine, home of Stephen Malinowski (http://www.musanim.com/index.html).

Wolfram Tones, © 2020 Wolfram Research, Inc.(http://tones.wolfram.com/generate/Glyp45wVdynU2yC82naMSsCUypJd4DdMCsB8Gq39Ho9.

Detroit Free Press, "GM engineer went from recording Jennifer Lopez to creating car sounds," by Jamie L. LaReau, Published Feb. 27, 2020 (https://www.freep.com/story/money/cars/general-motors/2020/02/27/gm-engineer-jennifer-lopez-car-sounds/4857157002/).

Popular Science: The Noise Issue (https://www.popsci.com/listen/).

Sciencemag.org, "Meet the scientist who turns data into music—and listen to the sound of a neutron star," by Giorgia Guglielmi, Jul. 21, 2017 (https://www.sciencemag.org/news/2017/07/meet-scientist-who-turns-data-music-and-listen-sound-neutron-star).

GitHub, Learn resource—'sonification' wtih Sonic Pi (https://github.com/stevelloyd/Learn-sonification-with-Sonic-Pi).

* cited by examiner

ENVIRONMENT AWARENESS SYSTEM FOR EXPERIENCING AN ENVIRONMENT THROUGH MUSIC

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to environment awareness enhancing and alerting systems.

Vehicles include one or more torque producing devices, such as an internal combustion engine and/or an electric motor, and are typically designed to be driven for extended periods of time. The vehicles can be non-autonomous or can be partially or fully autonomous. An occupant of a vehicle rides within a cabin (or passenger compartment) of the vehicle. Occupants within a vehicle can include a driver (or pilot) and one or more passengers. If the vehicle is fully autonomous, then all of the occupants may be referred to as passengers.

Vehicles may include sensors for sensing vehicle surroundings. As an example, a camera may be used to capture images of an environment outside of a vehicle. A vehicle may include forward facing, rear facing, and side facing cameras. Other example sensors for sensing vehicle surroundings include radar, sonar and light detection and ranging (LIDAR) sensors.

SUMMARY

An environment awareness system is provided and includes a memory, a first module and a second module. The memory is configured to store environmental data, one or more music composition templates, and one or more maps, where the environmental data is indicative of at least one of a state, condition, or change in an environment in which the environment awareness system is located. The first module is configured to receive and store the environmental data in the memory. The second module is configured to: based on the one or more music composition templates and the one or more maps, convert the environmental data to a music signal including modifying variables in the one or more music composition templates based on the environmental data; and based on the music signal, play out a musical composition via an audio system to audibly indicate the at least one of the state, condition, or change in the environment.

In other features, the system further includes the audio system. The audio system is configured to receive the music signal and play out the musical composition. The musical composition includes instrumental music.

In other features, the musical composition further includes a vocal part.

In other features, the memory is configured to store user preferences. The second module is configured to, based on the user preferences, generate or modify at least one of the one or more music composition templates or the one or more maps.

In other features, the system further includes an interface configured to receive a user input. The second module is configured to, based on the user input, select the one or more music composition templates based on a user preference indicated by the user input or an instruction included in the user input to change a track of the musical composition.

In other features, the second module is configured to generate the music signal to include different musical phrases for different points of interest.

In other features, the second module is configured to generate the music signal to include different musical phrases for different environmental conditions.

In other features, the second module is configured to generate the music signal to include motives to indicate musically distances to one or more points of interest.

In other features, the second module is configured to generate the music signal to include different musical compositions of different musical instruments to indicate musically different points of interest.

In other features, the second module is configured to generate the music signal to include sound effects to indicate musically changes in different environmental states or conditions.

In other features, the second module is configured to generate the music signal to include a dissonant chord to indicate musically a hazardous condition.

In other features, the second module is configured to generate the music signal to include a tension or a dissonance to indicate musically that a current state or condition does not match a user request.

In other features, the second module is configured to receive a user input and adjust parameters of the music signal based on the user input. The parameters include at least one of musical style parameters, instrumentation parameters, pitch mapping parameters, time control parameters and harmony parameters.

In other features, the second module is configured to adjust at least one of tempo, pitch, volume, melody, or harmony of the music signal based on changes in the environmental data.

In other features, the environmental data is received from one of one or more sensors.

In other features, the environmental data is received from a wireless network or a distributed network.

In other features, the system further includes a transceiver configured to transmit the environmental data from a vehicle to a mobile network device. The memory is implemented in the vehicle. The second module is implemented in the mobile network device.

In other features, the system further includes a transceiver configured to transmit the music signal from a vehicle to a mobile network device. The memory and the second module are implemented in the vehicle. The audio system is implemented in or connected to the mobile network device.

In other features, a network device is provided and includes the above-stated system and a transceiver. The transceiver is configured to receive the environmental data from at least one of a sensor, a vehicle or a distributed network.

In other features, a vehicle is provided and includes the above-stated system and the audio system. The audio system is configured to play out music within the vehicle based on the music signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
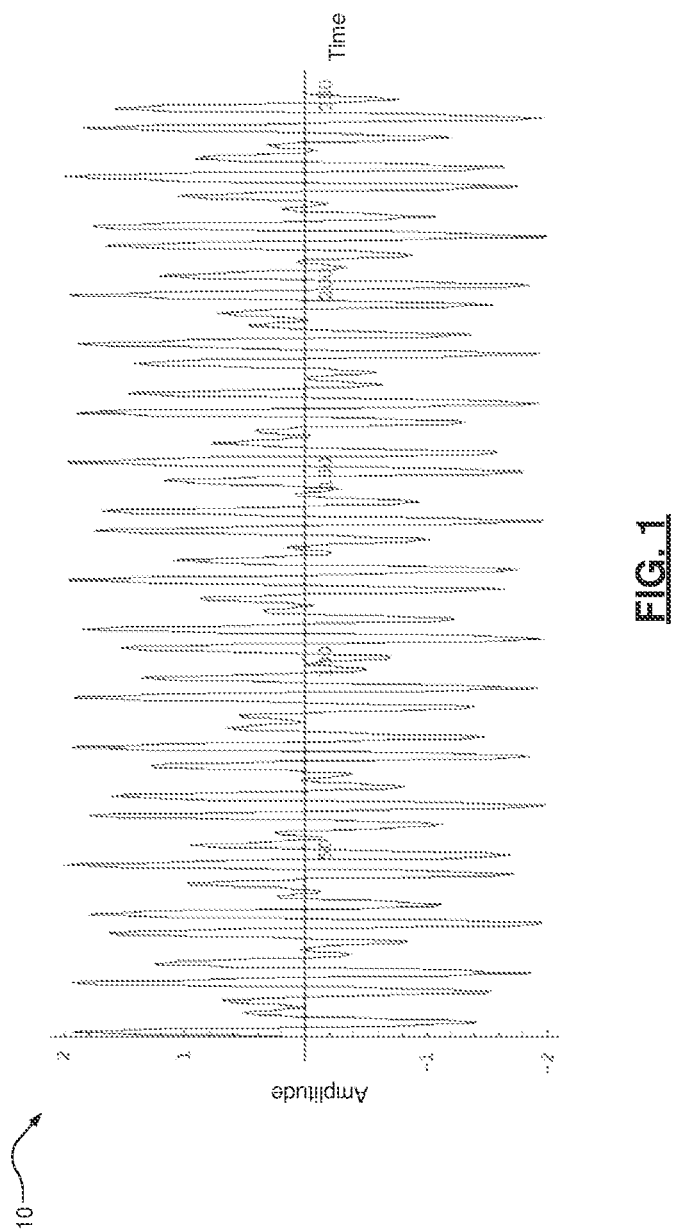
FIG. 1 is an example plot of two tones played over a particular time interval.

In various applications, environmental data may be tracked, monitored and acted upon. As an example, environmental data may be monitored to indicate to a driver of a vehicle that the vehicle is approaching an object (e.g., another vehicle). The environmental data may be shown to the driver via displays and/or audible sounds, such as showing a view rearward of the corresponding vehicle and generating a beeping noise when backing up and approaching an object. As another example, a display on a mobile device or a display within a vehicle may show a map and provide instructions to a particular location and/or indicate when the user has reached a selected destination. As yet another example, status information of vehicle systems may be visually displayed to indicate when there is an issue with a particular system and/or maintenance is needed. This information may be displayed by dashboard indicators and/or a head-up display.

In business, government, and academic arenas, a large amount of environmental data is produced. It can be difficult to convey such a large amount of data and/or corresponding conditions and/or parameters determined based on the data to a user in such a way that is discernable to the user. The data may be associated with a large number of variables and conveying such a large number of variables to a user can be overwhelming and/or simply not feasible. A user may ignore some or all of reported variables if too many variables are reported to the user.

Some conventional methods used for indicating environmental information includes two-dimensional and three-dimensional graphs, animated videos, visual warning screens, icons, etc. A first step in organizing and simplifying information to report to a user is dimensional reduction using principle component analysis, self-organizing maps and other techniques. The key is, however, for a user to understand the reported data without losing too much information.

The examples set forth herein include systems and environmental awareness modules for converting environmental data and corresponding detected conditions and parameters to musical sound. Musical sound is used for dimensional reduction to convey to a user in a simple to understand format various environmental information, such as mobile device or vehicle status information, outside whether conditions, information regarding a user's surroundings, destination information, safety conditions, hazardous information, etc. The examples may be implemented via a mobile network device (or mobile device), such as cellular phone, a smart phone, a tablet, a laptop computer, a wearable device, a vehicle (e.g., a land-based vehicle, an aircraft, or a watercraft), a bike, etc. In one embodiment, the systems are implemented for tracking, monitoring and reporting geographic information system (GIS) points-of-interest (PoIs) data. GIS PoIs may include (i) locations of a network device implementing the herein disclosed reporting methods, (ii) destinations selected by a user, (iii) physical structures, such as monuments or buildings being passed, (iv) parks being passed, etc. Environmental data and/or PoIs may further refer to and/or indicate locations of, for example, automated teller machines, bridges, cities, towns, entertainment venues, hazardous conditions (road, weather, flood, etc.), hotels, junctions and intersections, landmarks, medical facilities, parking structures, public safety (police stations, fire stations, weighing stations), railroad-crossings, and restaurants. Other environmental data is stated below.

The environmental data is converted to sound using musical composition. This allows the consumption of environmental data to be extended beyond text, graphs, and other visual indicators and/or simple auditory tones to include tracks of music. The examples take advantage of the auditory capabilities of humans (i.e. the users of the systems) to better inform the users of their surroundings. This is helpful for people that are at least partially visually impaired and enhances the experience of others that are not visually impaired. The examples allow a user to listen to the user's surroundings in an informed manner through music, not necessarily verbal instructions.

A driver's visual attention is already being taxed with multiple inputs during the act of driving safely by watching the exterior of the vehicle and periodically checking rear view and side view mirrors, a heads-up display and other displays and visual indicators. The examples allow a user to detect aspects of surroundings through music rather than needing to visually look at a rear view or side view mirror or look down at a display or dashboard indicator. Representing environmental information as music is well suited for non-structured data, which is often inexact and difficult to portray in a user-discernable manner. Non-structured data may refer to data that is not easily correlated and/or tabulated with other data and does not have designated relationships with other data and/or follow a standard schema. Structured data may refer to data that has designated relationships with other data and/or follows a structured schema. Additionally, environmental data from numerous different sources is able to be converted to music and allows such data to be mentally visualized. As a result, the user is able to mentally visualize a situation based on music heard by the user.

There are situations in which it is useful to convert sensor data, operational data, and/or real-time inputs into musical sound. For example, FIG. 1 shows a plot 100 of the function Sin[x]+Sin[√2x] plotted for an interval [0, 250]. This plot as seen by a person's eye appears complicated, but a sound with a corresponding waveform as heard by the person's ear is recognized as consisting simply of two pure musical tones. Thus, certain types of data may be grasped by a user more easily by converting the data into musical tones.

The examples also include conveying through music various satisfied conditions and/or relationships between environment data. The examples enhance and/or replace information conveyed visually with sonification to reduce the cognitive load on drivers, pilots, passengers and/or other users while operating and/or riding in a vehicle.

Figure 2:
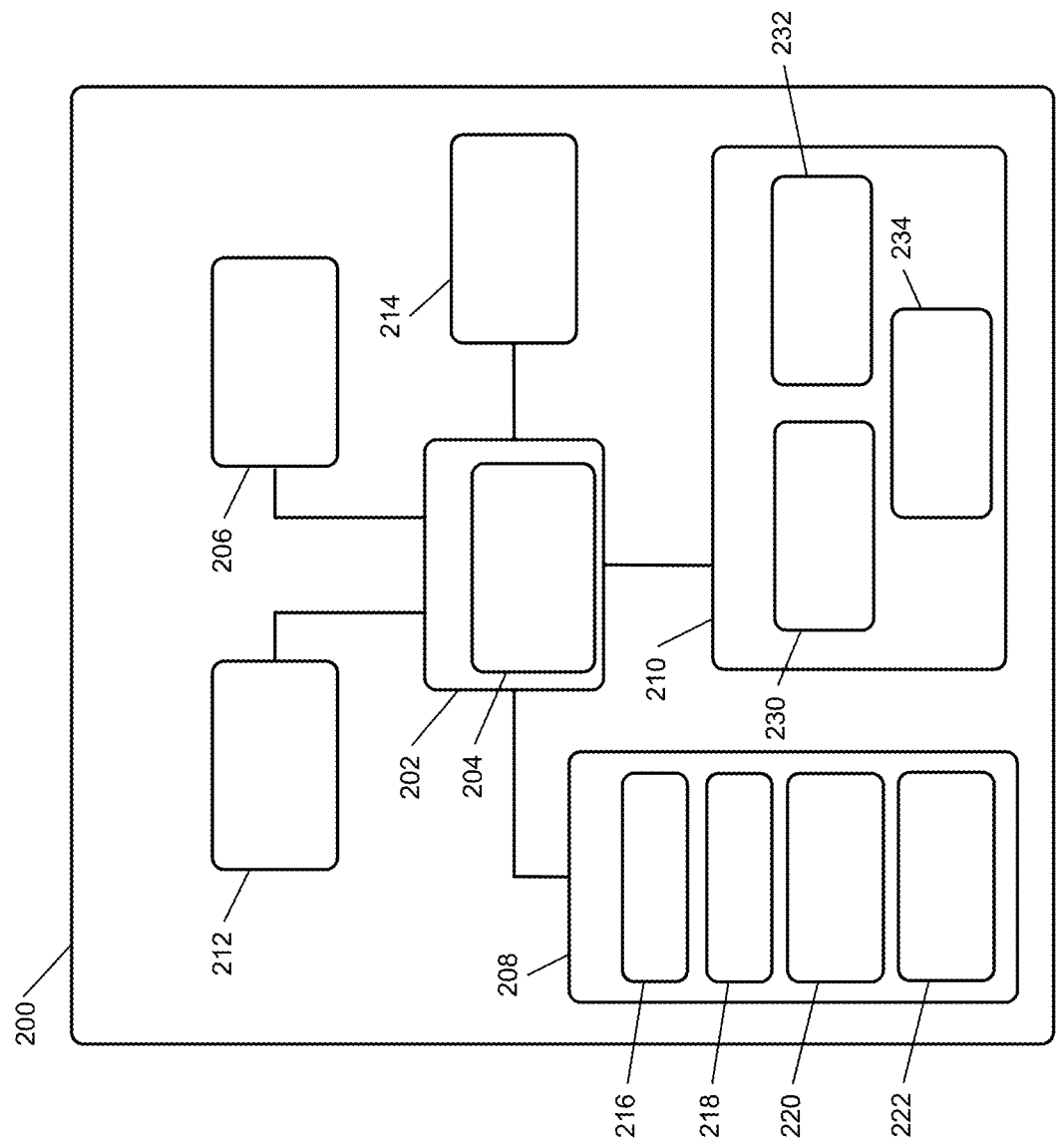
FIG. 2 is a functional block diagram of an example of a network device including an environment awareness module in accordance with the present disclosure.

FIG. 2 shows a network device 200 including a control module 202 having an environment awareness module 204. The network device 200 may be a mobile network device or other network device, such as a desktop computer, a home assistant device (or smart home controller hub), a vehicle or portion thereof, etc. The environment awareness module 204 obtains environmental data, converts the data to music, and plays the music via an audio system 206, which may include speakers, ear buds, etc. In one embodiment, the environmental data is continuously played out until audio play out of the music is disabled for example by the user. The music may be played out as background music or as music selected by a user and generated based on user preferences, as further described below. The network device 200 may include sensors 208, memory 210, a display 212, and a transceiver 214. The sensors 208 may include cameras 216, an accelerometer 218, one or more temperature sensors (one temperature sensor 220 is shown), and/or other sensors 222. Other example sensors are disclosed below.

The environment awareness module 204 may collect environmental data from various sources, such as the sensors 208, the transceiver 214, other modules, and/or the memory 210. Environmental data may be collected and stored in the memory 210. The network device 200 may communicate with other network devices and receive environmental data via the transceiver 214. The environment awareness module 204 may also analyze the environmental data to determine if certain conditions exist and store the conditions in the memory 210 as additional environmental data. The memory 210 stores the environmental data (designated as 230), music compositions 232 and a data-to-music mapping algorithm 234. The data-to-music mapping algorithm may include functions, tables, formulas, relationships, etc. to map environmental data to variable values. As used herein, a music (or musical) composition refers to (i) a piece or work of music (vocal and/or instrumental), and/or (ii) the structure of a musical piece. The music compositions 232 include variable and coded music compositions (hereinafter referred to as "music compositions") with variables that are modifiable based on the environmental data. The variable values are applied to the music compositions 232 to alter how the music compositions are played out, as further described below.

Phrase

The music compositions may include one or more musical phrases. A musical phrase is a succession of tones that are grouped together and have a sense of completion and unity like that found in a verbal sentence and built from figures, motifs, and cells. Phrases may be combined to form melodies, periods and larger sections of music. A phrase is a substantial musical thought, which ends with a musical punctuation called a cadence. Specific distinct musical phrases may be associated with PoIs and/or other environmental data. The musical phrases may be custom-created or selected from a database of pre-existing phrases (e.g., the ditty for a commercial of a particular restaurant may be used to indicate such a restaurant is nearby). The phrases may be embedded in background music that may also be custom-written or selected. The background music may be an existing piece of music, furnishing the listener with a pleasing and continuous ambient music within which the musical phrases fade in and fade out. As an example, to indicate to a user nearby presence of an internal PoI of a larger PoI (e.g., a particular neighborhood of a city or different types of PoIs within a downtown area), chain phrases may be used. A chain phrase is a single phrase composed of a thematic complex musical idea.

Motive

The compositions may include motives. As an example, a motive may be used to indicate a distance from a current location of the user to a PoI. A motive (or motif) is a musical structure including a short continuously or frequently recurring musical figure or shape. Each motive has a different character and profile. Different distinct motives may be assigned to each of the different PoIs that are not contiguous. Contiguous PoIs may share a motive or have overlapping motives.

Voices

As another example, different "voices" may be included in the music compositions and be allocated to different PoIs. A voice may refer to the use of a particular instrument or group of instruments to indicate a particular PoI. Each specific PoI may be allocated a different set of one or more instruments. In one embodiment, each PoI is allocated a different section of an orchestra, in other words, different sets of instruments. The voices may be played out such that a user is able to simultaneously hear portions of the played out music corresponding respectively to two or more PoIs, such as a restaurant and a hotel.

As the number of sonified PoIs increases and is played out, it can become for a user increasingly difficult to accurately detect any single one sonified PoI. To minimize this problem, the amount of PoIs tracked may be limited and the number of different sets of instruments used for each PoI being tracked may also be limited. As an example, the 3-5 PoIs may each include four instruments such as a Classical String Quartet or a Jazz Quartet.

Automated algorithms implemented by the environment awareness modules may be used to assign different PoI musical phrases to different instruments. These algorithms may determine, based on configuration values, when to play various PoI musical phrases. A PoI musical phrase may be used to indicate an approaching next "large city" as that city is within different distances (e.g., 100, 50, 25, 10 miles) of the moving vehicle. The volume or intensity of the phrase may be increased as the PoI becomes closer to the user.

Other Contents of Music Composition

Sound effects such as panning a musical voice to a left or right speaker and changing the volume of the musical voice may be done. The sound effects may be done to maximize the individuality of sonification elements of the music. Various effects may be provided and include arranging, voice leading, development of complete melodic phrases, etc. These various effects may have respective sonification parameters that are set to provide the corresponding effects. The sound effects may be used to indicate where environment information is located. For example, the sound effects may be provided to indicate to the user "Passing a PoI on your left", "vehicle approaching quickly from the right", etc.

Hazardous road conditions, traffic pileups, other road and traffic conditions, foggy weather, slippery roads, winter storms, floods, fires and/or other conditions detected may each be provided a respective musical phrase. As another example, when there are not any hazardous conditions or faults to report to the user, the overall tempo of the music being played may be slow and steady. When a hazardous condition arises, the environment awareness module 204 may increase the tempo of the music. The tempo may be adjusted based on a degree of the severity of the condition. The environment awareness module 204 may play the corresponding alert phrase for a specific hazard and increase volume of the music being played to better bring it to the attention of the user. The value of the volume may be increased based on a noise level inside a cabin of the vehicle, which may be detected by a microphone. The alert phrase is played loud to assure that the user hears the corresponding alert.

Additionally, the disclosed musical generation and play out process allows many dimensions of data to be represented in a compact form by mapping environmental data onto variable musical dimensions of a musical composition. The musical dimensions include volume (loudness), pitch, tempo, and harmony. Since a phrase is a melodic-harmonic-rhythmic construct, the melodic, harmonic and rhythmic musical dimensions may be used to indicate other attributes of a PoI. A composer and/or designer may program the environment awareness module 204 of FIG. 2 or other environment awareness module disclosed herein to automatically alter these dimensions for a phrase based on GIS data, road conditions, status information and/or other environment data. The modules may also be programed to alter the phrases based on stored user preferences. Some user preferences may include types, styles and/or genres of music of interest, types of PoIs to detect, safety conditions to detect, status information to report, etc.

Pitch

The environment awareness module 204 may adjust pitch. For example, the note A above middle C played on a piano is perceived to be of the same pitch as a pure tone of 440 Hz. Music theorists sometimes represent pitches using a numerical scale based on the logarithm of a fundamental frequency.

As an example, the environment awareness module 204 may adopt the Musical Instrument Digital Interface (MIDI) standard to map a fundamental frequency f to a real number p for pitch as follows: $p=69+12*x[\log 2 (f/440)]$, where x is the real value that comes from the data that is being monitored for possible hazards. Different environmental data values for x results in a different pitch being played and heard. This is one algorithm example among many that may be used to transform a data set into music. In one embodiment, the data (or corresponding functional representations) are not used to generate a musical score, such as playing a note at a position of each peak since normally no pleasing sound can be generated in that manner.

In one embodiment, the environment awareness module 204 converts a sequence of numbers coming from various environmental data sources, such as databases, sensors, control modules, etc., to waveforms of musical sound. In another embodiment, the environment awareness module 204, instead of converting the sequence of numbers directly to a waveform of musical sound, obtains a musical form for a specific PoI and plays each note (of a certain frequency) for a specific short period of time. A musical form refers to a structure of a musical composition or performance. A number of organizational elements may determine the formal structure of a piece of music, such as the arrangement of musical units of rhythm, melody, and/or harmony that show repetition or variation. This may include the arrangement of the instruments or the way a symphonic piece is orchestrated among other factors. These organizational elements may be broken into smaller units referred to as phrases.

Clicks are avoided by arranging the waveform to cross the zero both at the beginning and at the end of each note. In this type of setup with nested sequences, both repetitive and random musical forms, tend to generate pleasing tunes. The environment awareness module 204 may either determine frequencies of notes directly from values of elements, or from cumulative sums of each of the values such as a sum of one more distance values, temperature values, humidity values, and/or other parameters.

Tempo

The environment awareness module 204 may also adjust tempo based on environmental data. Tempo is the speed or pace of a given piece of music and is usually indicated in beats per minute (BPM). This means that a note value (for example, a quarter note or crotchet) is specified as a beat and the corresponding marking indicates that a certain number of these beats is to be played per minute. The greater the tempo, the larger the number of beats that is played in a minute and the faster a piece of music is played. The environment awareness module 204 may allow a user to set an initial tempo and/or other tempos of music. This may be an adjustable parameter set via the display 212 or other interface. In one embodiment, tempo is used to indicate distance to and from PoI. Tempo is one example data dimension, other data dimensions are disclosed herein, which may be used to indicate various environmental information.

Harmony

The environment awareness module 204 may adjust harmony of music to indicate different environment data. Harmony is a combination of simultaneously sounded musical notes to produce chords and chord progressions having a pleasing effect. Harmony may include pitch simultaneity, and therefore chords, actual or implied. There are certain basic harmonies. A basic chord consists of three notes: the root, the third above the root, and the fifth above the root (which is the minor third above the third above the root). As an example, in a C chord, the notes are C, E and G. In an A-flat chord, the notes are A♭, C, and E♭. In many types of music, notably baroque and jazz, basic chords are often augmented with "tensions". A tension is a degree of the scale, which, in a given key, hits a dissonant interval. The most basic, common example of a tension is a "seventh" (a minor, or flat seventh)—so named because it is the seventh degree of the scale in a given key. While the actual degree is a flat seventh, the nomenclature is simply "seventh". Thus, in a C7 chord, the notes are C, E, G, and B♭. Other common dissonant tensions include ninths, elevenths, and thirteenths. In jazz, chords can become very complex with several tensions.

The environment awareness module 204 may play a composition that includes a tension. The tension may be played, for example, when a hazard is detected. The environment awareness module 204 may "resolve" the tension when the hazard does not materialize and/or is no longer present. For example, a dissonant tension may be created when a vehicle is about to be in a location experiencing lake affect snow, and after passing the location the dissonance may fade away. A dissonant chord (chord with a tension) may be played and resolved by playing a consonant chord. A good harmonization usually sounds pleasant to the ear when there is a balance between the consonant and dissonant sounds. In simple words, good harmonization occurs when there is a balance between "tense" and "relaxed" moments. Because of this reason, tensions are 'prepared' and then 'resolved'.

Preparing a tension means to place a series of consonant chords that lead smoothly to the dissonant chord. In this way, there is a buildup of the tension piece smoothly, without disturbing the listener. Once the piece reaches a sub-climax, the listener is given a moment of relaxation to clear up the tension, which is obtained by playing a consonant chord that resolves the tension of one or more previous chords. The clearing of the tension is usually pleasing to the listener.

Tensions may be generated and used as a pathway to a PoI in a musically sensible manner. The more tension or dissonance, the more a PoI may be mismatched against what a driver desires. The disclosed system harmonizes several data feeds/sequences of numbers by choosing a base key for the music and converts the data feeds/sequences to the same key if the data is similar to that being monitored or converts data feeds/sequences to a dissonant key if the data does not match that be monitored.

The environment awareness module 204 may indicate existence of PoIs in the form of musical dissonance or tension provided over background music being played. A musical PoI added to the background music is distinguishable from the background music to the driver and the driver is able to instantly recognize the indication of the PoI for what it is and then take appropriate action. The musical PoI is blended with the background music and distinguishable to the listener, but indistinguishable in that the user is unable to detect that the musical PoI is not part of the overall music being played because of the blending.

The degree of closeness of a match of environmental data to a predefined PoI may be indicated to a user by using consonant and dissonant harmonies and/or other change. The closer the match, the more perfect or consonant the harmony. In one embodiment, a different pitch is assigned to each PoI. In another embodiment, each PoI is mapped to a different musical instrument and a harmony is used to handle a set of multiple PoIs in a manner that is pleasing to the human ear. In yet another embodiment, tensions are used as a pathway to POIs in a musically sensible manner. The more tension or dissonance, the more a musical PoI is mismatched against what a user's preferences are with regards to music. The other changes may include, for example, a particular drum line, a melodic addition, a pitch change, a temperature change, sound of a cowbell, a shift from one genre to another genre, etc.

The environment awareness module 204 may permit the user to configure the style, instrumentation, pitch mapping, and time controls of the music (also referred to as environmental reporting music). The user, as a result, is able to choose the music settings to which the user is able to relate. The user may select a musical style, instrumentation, one or more keys for the music, tempos, and types of harmonies to play. The environment awareness module 204 may harmonize several data feeds/sequences of numbers from one or more environmental data sources and select a base key for the music. The base key may be one of the selected keys if the data received is similar or matches data associated with a PoI (or other environmental information being tracked), or be a dissonant key if the data received does not match data associated with the PoI (or other environmental information being tracked).

Various software and hardware techniques may be implemented by the environment awareness module 204 and used to generate the music based on the environmental data and/or information. The user may select any combination of musical style, instrumentation (instrument selection), pitch mapping, time controls, and/or harmony to customize the feel of the music being generated. The environment awareness module 204 may display a screen via which the user may make and adjust these selections. Additionally, the environment awareness module 204 may include software to create new musical forms from an initial set of distinct musical forms that were previously created or selected initially to indicate specific PoIs and/or other environmental information.

The techniques may include artificial neural networks (trained), cellular automata, generative grammars, genetic algorithms, self-similarity (fractal music), transition networks and mapping strategies. Artificial neural networks (trained) may be used to produce surprising movements that conform to the underlying corpus used to train them—mimicking the style of that corpus. The neural networks may be trained based on environmental data received and actions performed. Cellular automata may be used to implement unique personal compositional strategies. Generative grammars may be used to enable context-related and hierarchical organization of musical material in a sequential manner.

Genetic algorithms may be used to produce a large number of small musical form segments for a process-like composition. Self-similarity may be used for generating new music through self-similarity transformations. Transition networks may be used to enable different compositional strategies in the sense of programming languages. Mapping strategies include decisions with regards to mapping GIS and/or other environmental data to musical forms in a manner suitable to encode by a programming language.

For example, the environment awareness module 204 may start with a musical form, which has been designated to indicate a city, and select and apply one or more of the above approaches and techniques to automatically create different and distinct musical phrases. This may be accomplished for different cities without having to create a different musical phrase for each city beforehand. Similarly, the environment awareness module 204 may start with a musical phrase that indicates a generic store and proceeds to derive or create from it—applying the above approaches and techniques—musical phrases for different types of stores.

The following examples may be set up by a composer and be stored in the memory 210 and implemented by the environment awareness module 204. The examples may be modified automatically by the environment awareness module 204 and/or based on user inputs. The following examples include tables for mapping environmental data to various musical forms. The mapping information is used to programmatically produce music. For example, artificial neural networks may be used to generate the music in a specific genre and style of music; after the artificial neural network is trained. The genre may be a string quartet in the style of a particular composer (e.g., Mozart) or a jazz orchestra in the style of a particular singer or conductor (e.g., Cab Calloway). The example mapping disclosed herein is not exhaustive. A musical form may include a sonata—with an introduction, exposition, development, recapitulation—to characterize an extended journey, with PoIs, destination, weather, road conditions etc. Such techniques as inversions, variations etc. may also be included. As an example, a theme may be used to denote the class of cities—and then vary it to indicate specific cities—thus establishing relationship among various objects of the same kind (i.e. type and class).

Table 1 shows examples of mapping geographical information to musical forms. In Table 1, the checking of the volume box indicates that the volume is increased to indicate corresponding environmental information (Env. Info.).

TABLE 1

Examples of Mapping Geographical Information to Musical Forms

| Env. Info. | Phrase | Motive | Harmony | Melody | Tempo | Pre-recorded Music | Dissonance | Consonance | Genre & Style (selectable) | Volume |
|---|---|---|---|---|---|---|---|---|---|---|
| City | X | | X | | | | | X | X (Jazz) | |
| Distance | | | X | X | | | | X | X (Jazz) | |
| Road | X | | | | | | | | X (Jazz) | |
| Hazardous Weather | | | X | | | | X | | X (Jazz) | X |
| Hazardous Traffic | | | X | | | | X | | X (Jazz) | X |
| Police | | X (Reoccurring) | | | | X (e.g. a musical siren) | | | X (Jazz) | |
| Hospital | | X (Reoccurring) | | | | X | | | X (Jazz) | |
| Food | | X (Reoccurring) | | | | X (e.g. MacDonald's Jingle) | | | X (Jazz) | |
| Fuel | | X (Reoccurring) | | | | | | | X (Jazz) | |
| Lodging | | X (Reoccurring) | | | | | | | X (Jazz) | |
| Shopping | | X (Reoccurring) | X | | | | | | X (Jazz) | |
| Train Junctions | | X (Reoccurring) | | | | X (e.g. something sounding like a train whistle) | | | X (Jazz) | X |
| Intersections | | X (Reoccurring) | | | | | | | X (Jazz) | X |
| Landmarks | | | | | | | | X | X (Jazz) | X |
| Other PoI | X | | X | | | | | X | X (Jazz) | X |

Table 2 shows examples of mapping geographical information to musical instruments (e.g. a jazz quintet). In Table 2, environmental information is mapped into a musical style of jazz and more specifically to a jazz quintet. Several data inputs are mapped onto the same instruments, relying on musical harmony to convey multiple types of information on the five instruments. If human voices are employed, such as in operatic or rap music genres, words may be employed to convey the information as well—in such cases, the environment being experienced by the user (or the "world" around the user) is being played out to the user in the form of instrumental music and singing (or human voices).

TABLE 2

Examples of Mapping Geographical Information to Musical Instruments

| Env. Info. | Bass | Trumpet | Tenor Saxophone | Piano | Drums |
|---|---|---|---|---|---|
| City | X | | X | | |
| Distance | X | | X | | |
| Road | X | | X | | |
| Hazardous Weather | | X | | | X |
| Hazardous Traffic | | X | | | X |
| Police | | | | X | X |
| Hospital | | X | | X | X |
| Food | | X | | X | X |
| Fuel | | X | | X | |
| Lodging | | X | | X | |
| Shopping | | X | | X | |
| Train | | X | | | X |
| Junctions | | (Reoccurring) | | | |
| Intersections | | X (Reoccurring) | | | X |
| Landmarks | | | | X | X |
| Other PoI | | | | X | X |

Table 3 shows examples of mapping driver directions using chimes and chords. A chord includes 3 notes or more played simultaneously. With 3 notes, $3^3$ or 27 possible driver actions may be indicated. This may be in the form of high-pitched/high volume whistles, which may be kind considered unpleasant in a stream of music, or in the form of some other percussion instrument.

TABLE 3

Examples of Mapping Driver Directions Using Chimes and Chords

| Env. Info. | Chord | Pitch | Tempo | Prerecorded Music | Percussion Instrument |
|---|---|---|---|---|---|
| Accelerate | | | | X | |
| Drive Backwards (Rear Gear) | X | X | X | | X |
| Hard Stop | X | X | X | | |
| Maintain Speed | | | | X | X |
| Resume Driving | X | X | | | X |
| Slow Down | | | | X | |
| Speed Up | | X | X | | |
| Stop Accelerating | | X | X | | X |
| Turn Around | X | X | X | | |
| Turn Left | X | X | X | | |
| Turn Left Hard | X | X | X | | |
| Turn Right | X | X | X | | X |
| Turn Hard Right | X | X | X | | X |

At a simplest level, the played chords may be phrases or music, such as chimes that are introduced into a stream of music and spread over different instruments.

The environment awareness module 204 may also use other approaches such as: a tone or a chord that changes pitch (wave frequency) as a next turn in a road approaches (i.e. the tone or chord is played at a higher octave); a pulse of tones that becomes more frequent as a user approaches a next turn in a road; a chord that changes in tempo to indicate slowing down or speeding up; use of a stereo system to change a location of sound from left to right and/or front to back to inform the user of a side of a vehicle that a turn in a road is on; and/or other approaches. The environment awareness module 204 may indicate via music actions and behaviors of nearby vehicles. This may include a set of tones/chords that identify specific or possible events and/or provide specific warnings. A set of tones/chords may be played to indicate that a vehicle is approaching too quickly or a collision may occur and provide a side-collision, front collision or rear-collision warning. The closeness of a vehicle may refer to a specific modality of operation. Different tones, chords, phrases, motives, etc. may be played for different modalities. The side-collision warning may include using a stereo system to move sound from left to right to indicate direction and speed of a possible collision. The rear-collision warning may include using a stereo system to inform the user of a velocity of, for example, a vehicle prior to a rear collision by moving sound from rear speakers to front speakers.

A particular song may be played for a user and the song may be changed to include different compositions indicating changes in the environment. The particular song may be in a particular music style, genre, etc. that the user enjoys. The song may sound similar to a song of a particular artist that the user has indicated is a preferred artist. The song may be similar to songs in the user's playlist. The play out of the music allows the user to effectively listen to environment and detect through music changes in the environment.

In one embodiment, a baseline of default compositions are stored in the memory 210 and updated and/or modified over time. Each of the compositions as further described below may be modified based on the environmental information received in real time (i.e. as the environmental information is received and processed). As an example, the user of the network device 200 may have visual acuity issues and indicate to the environment awareness module 204 to operate in an environment awareness mode including playing music that indicates environmental information. The user may be: on a bike; in an autonomous vehicle; walking in a building, a city, or a park; driving a vehicle; or in a ride sharing bus and become aware of the surroundings through music. For example, the user may become aware of: an emergency event that is about to occur; a weather condition; a corresponding vehicle is leaving a city or approaching a destination; etc.

Figure 3:
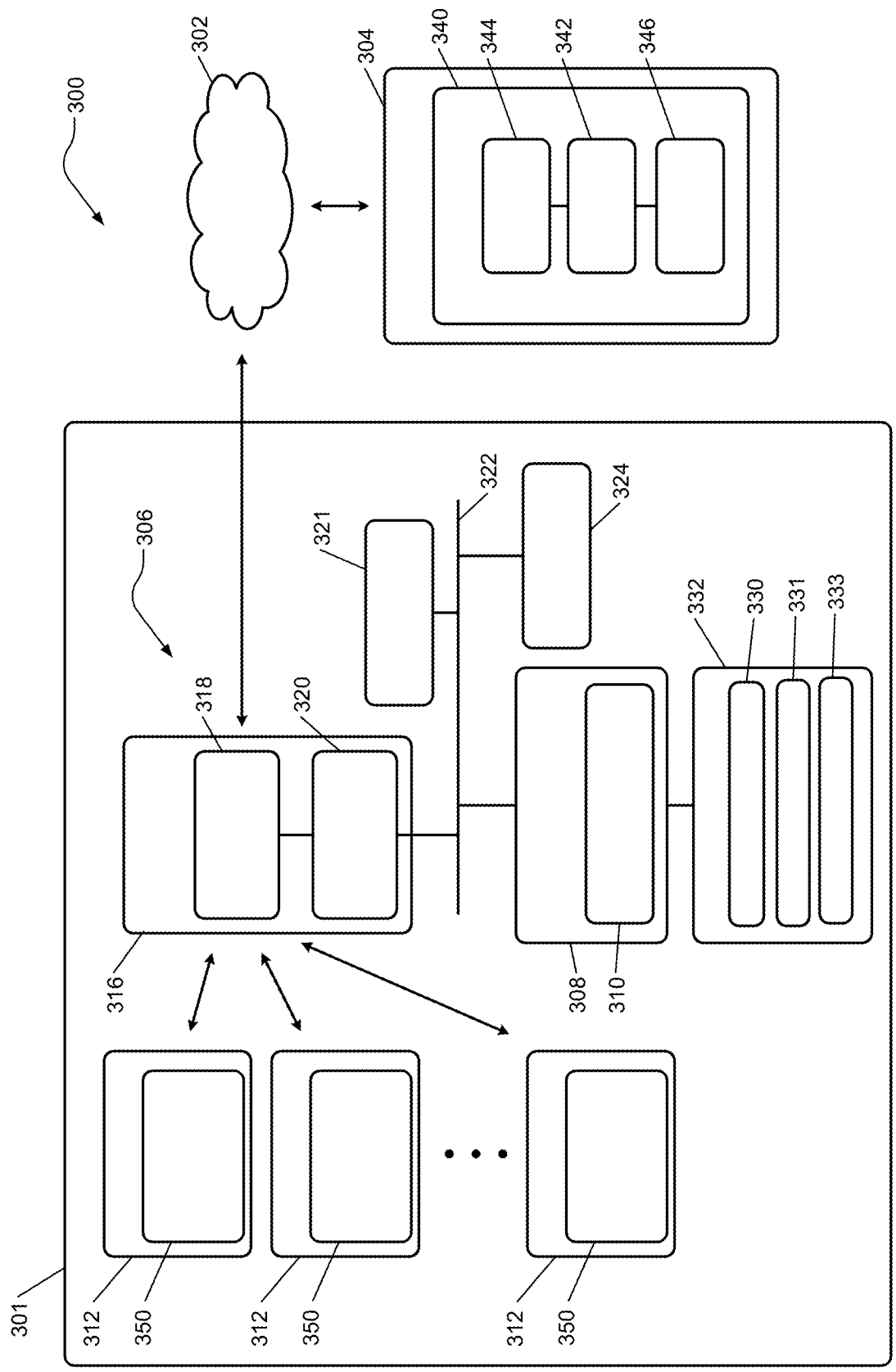
FIG. 3 is a functional block diagram of an example of an environment informing system in accordance with the present disclosure.

FIG. 3 shows a vehicle entertainment access system 300 that includes a vehicle 301, a distributed communications system 302, and a central office 304 of a service provider. The vehicle 301 includes an environment awareness system, a portion of which is shown and designated 306. The environment awareness system includes an environment awareness module 308 that executes an environment awareness application 310. The environment awareness module 308 communicates with mobile devices 312 and the central office 304 via a telematics module 316.

The mobile devices 312 may be implemented as displays, portable network devices, and/or other network devices. The displays (or viewing devices) may include head up displays (HUDs), laser holographic devices, liquid crystal displays (LCDs), and/or other 2D and 3D displays. A windshield and/or window may be used to display items and as such may be referred to as a display. The telematics module 316 includes transceivers 318 and a telematics control module 320, which may include Bluetooth® transceivers, wireless local area network (WLAN) transceivers, wireless fidelity (Wi-Fi®) transceivers, cellular transceivers and/or other transceivers.

The environment awareness module 308 is connected to the telematics module 316, a vehicle control module 321, and other modules 324 via a bus 322 (e.g., a controller area network (CAN) bus). The environment awareness module 308 stores occupant information 330 and preferences 331 and environment information (or data) 333 in a memory 332. As used herein the term "occupant" may be replaced with the term "user". As further disclosed herein, the environment awareness module 308 sends environment information and/or compositions to play out to the mobile devices 312 based on the occupant information and preferences.

The environment awareness module 308 communicates with a monitoring station 340 of the central office 304 via the distributed communications system 302. The monitoring station 340 may include a control module 342, a transceiver 344 and a database and/or memory 346. Occupant information and preferences may be stored in the database and/or memory 346 and shared with the environment awareness module 308. The monitoring station 340 may operate as, include and/or have access to cloud-based storage. The environment awareness module 308 may access the Internet and provide Internet connectivity for downloading advertisements, educational information, business and/or building identification information, restaurant information, etc. via the distributed communication system 302. The environment awareness module 308 may convert the provided information to music and play out the music via an audio system of the vehicle or transfer the information and/or compositions to the mobile devices 312 for play out via the mobile devices 312.

In one embodiment, the environment awareness application 310 is implemented as part of a vehicle communication interface module (e.g., an OnStar® module) and the monitoring station 340 provides remote services associated with the vehicle communication interface module. The vehicle communication interface module may be one of the other modules 324. Occupant information and information pertaining to objects may be obtained through an Internet connection and/or backend services provided within the vehicle 301 as further described below. The backend services may be at least partially provided by the monitoring station 140 and/or other remote network device.

The environment awareness module 308 may detect, receive, determine and/or obtain various environmental information and indicate the environmental information in the form of music to the mobile devices 312. The environmental information may be broadcast to the mobile devices 312. Each of the mobile devices 312 may receive data fed by the environment awareness module 308 and convert the data to music via an environment awareness module 350 based on preferences of a particular user of that mobile device. The environment awareness module 308 and the environment awareness modules 350 may operate similarly as the environment awareness module 204 of FIG. 2.

Figure 4:
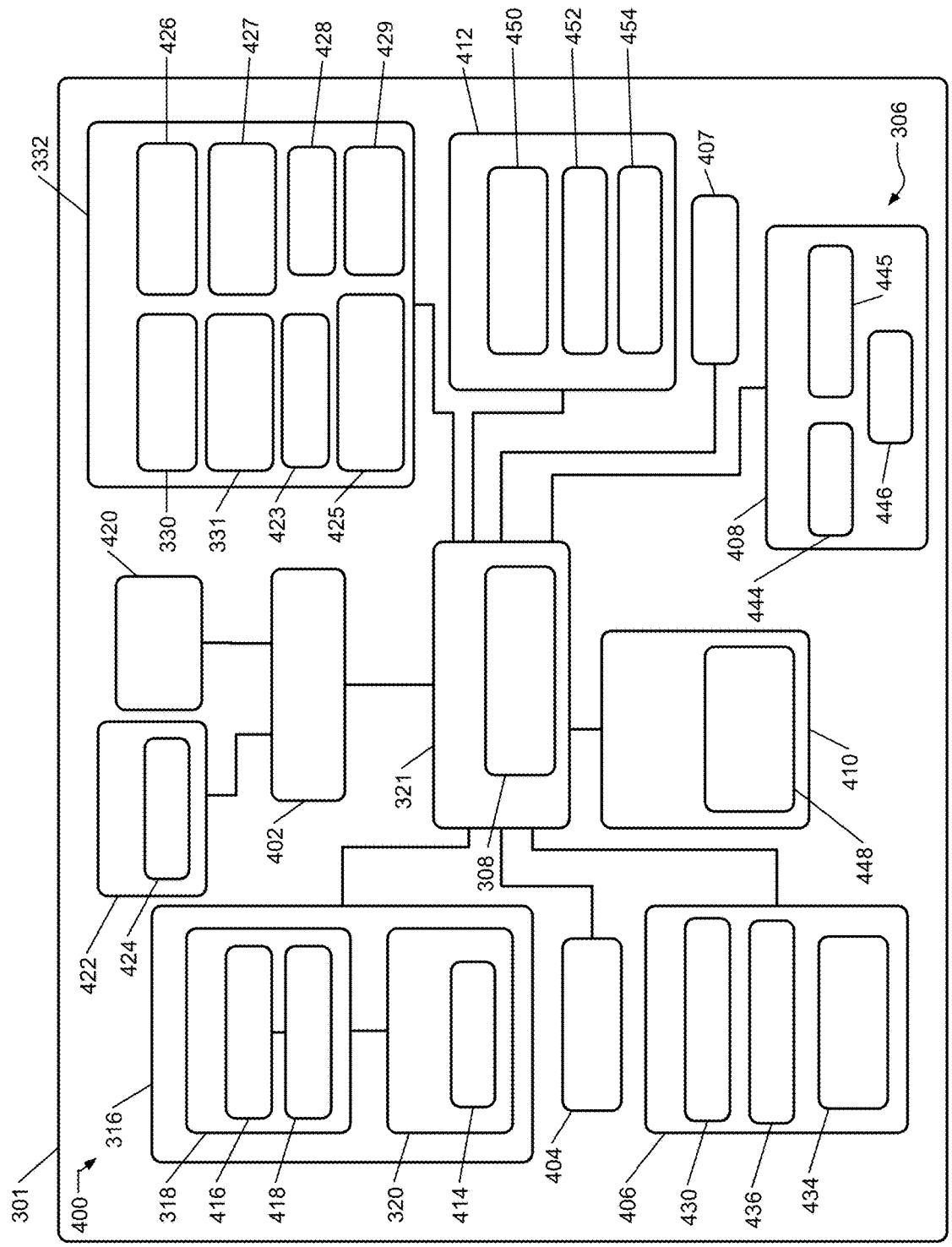
FIG. 4 is a functional block diagram of an example of a vehicle including an environment awareness module in accordance with the present disclosure.

FIG. 4 shows the vehicle 301 incorporating a vehicle system 400 including the environment interactive system 306. The vehicle 301 includes the vehicle control module 321, which may include the environment awareness module 308 or the environment awareness module 308 may be included as part of an infotainment module 402. The vehicle 301 further includes the telematics module 316, the memory 332, a navigation module 404, sensors 406, microphones 407, a propulsion system 408, an inertial measurement module 410, and other vehicle systems 412.

The telematics module 316 provides wireless communication services within the vehicle 301 and wirelessly communicates with service providers. The telematics module 316 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 316 may include the transceivers 318 and the telematics control module 320. The telematics control module 320 may include a global positioning system (GPS) 414. The transceiver 318 includes a physical layer (PHY) module 416 and a medium access control (MAC) module 418. The PHY module 416 wirelessly communicates with network devices internal and external to the vehicle 301. The MAC module 418 may perform pattern recognition, channel addressing, channel access control, and filtering operations.

The infotainment module 402 may include and/or be connected to an audio system 420 and/or a video system 422 including one or more displays 424. The audio system 420 and the video system 422 may provide vehicle status information, diagnostic information, prognostic information, entertainment features, and other vehicle and non-vehicle related information. The entertainment features may include: object information; weather information, business information; and/or other environment information. The displays 424 may also display (i) items captured by the external cameras 430 including objects detected that are external to the vehicle, and (ii) information associated with the detected objects. The audio system 420 may play music indicating presence and/or information associated with the detected objects. By providing environment information through music, a driver of the vehicle 301 is better able to keep his or her eyes on the road ahead and less likely to be distracted by visually provided indicators. The audio indications may be provided instead of or to supplement visual indications.

The vehicle control module 321 may control operation of the vehicle 301 including operation of the propulsion system 408 and other vehicle systems 412. The memory 332 may store the occupant information 330, the occupant preferences 331, entertainment information 423, Internet based information 425, object information 426, business information 427, map data 428, and other environment data 429. The occupant (or personal) information 330 may include, for example, occupant names, occupant identifiers (IDs), occupant passwords, facial recognition information, fingerprint recognition data, eye recognition data, and other personal information. The object information 426 and the business information 427 may include names of the objects and businesses, addresses of the businesses, ages of the objects and businesses, histories of the objects and businesses, etc. The occupant preferences 331 may include personal applications, preferred podcasts, music preferences, types of information searched, online videos watched, social media information, preferred restaurants and/or bars, hobbies, work related information, vacation locations, items searched and/or purchased, preferred hotels, preferred airlines, preferred methods of traveling, etc. Restaurant related information may include types of food preferred, coffee shops preferred, rating and cost preferences, etc.

The entertainment information 423 may include some of the occupant preferences, and/or trivia information and/or information related to a local environment surrounding the vehicle 301, local events, popular "things to see" in a local area, the Internet based information 425, the object information 426, the business information 427, etc. The Internet based information 425 may include information related to websites, products, services, videos, restaurants, and/or other items searched and/or viewed via the Internet.

The object information 426 may include fauna and/or flora information, architectural information, historical information, landmark information, building information, etc. The business information 427 may include historical information, information describing the business, building information, architectural information, stock information, company status information, etc. The map data 428 may include geographical data, location identification information, and local weather. The other data 429 may include traffic information, time of day information, etc.

The navigation module 404 executes a navigation application to provide navigation services. As an example, if the vehicle 301 is an autonomous vehicle, the navigation module 404 may direct the vehicle control module 321 to a certain location.

The sensors 406 may include cameras 430 and other vehicle sensors 434 (e.g., a vehicle speed sensor, temperature sensors, pressure sensors, flow rate sensors, etc.). The cameras 430 may be 2-dimensional cameras, 3-dimensional cameras, depth cameras, infrared cameras, visible light cameras, and/or other suitable cameras. The cameras 430 and the telematics control module 316 may be used to detect objects external to the vehicle 301. The cameras 430 may include corresponding infrared (IR) sources 436. IR sources may be used on an exterior of a vehicle, when for example there is low visibility (visibility distance is low), such as on a foggy day. In one embodiment, visible light cameras and IR cameras are used. The cameras 430 are used to monitor areas surrounding the vehicle and may be in various locations on the vehicle. The microphones 407 may be used to receive audio commands and/or to receive verbal inputs from occupants and/or to detect noise levels within a cabin of the vehicle 301.

The propulsion system 408 may include an internal combustion engine 444, a transmission 445, and/or one or more electric motors 446 to propel the vehicle 301. The vehicle control module 321 may control the propulsion system 408 to cause the vehicle 301 to move to selected locations.

The inertial measurement module 410 includes inertial measurement sensors 448, such as accelerometers and/or rate sensors. The inertial measurement module 410, as an example, may be located at or near a center of gravity (cg) point of a vehicle. The inertial measurement sensors 448 may be used to measure longitudinal and lateral accelerations and/or longitudinal and lateral velocity of the vehicle 301. The longitudinal and lateral accelerations and the longitudinal and lateral velocity may be integrated to determine pitch angles and roll angles of the vehicle 301 to determine orientation of the vehicle.

The environment awareness module 308 may detect environment information related to the various types of information stored in the memory 332 and indicate the environment information through music via the audio system 420. The environment awareness module 308 may also indicate information collected from the navigation module 404, sensors 406, the inertial measurement module 410, the propulsion system 408 and the other vehicle systems 412.

The other vehicle systems 412 may include air-conditioning systems 450, seat systems 452, lighting systems 454 and/or other vehicle systems.

Figure 5:
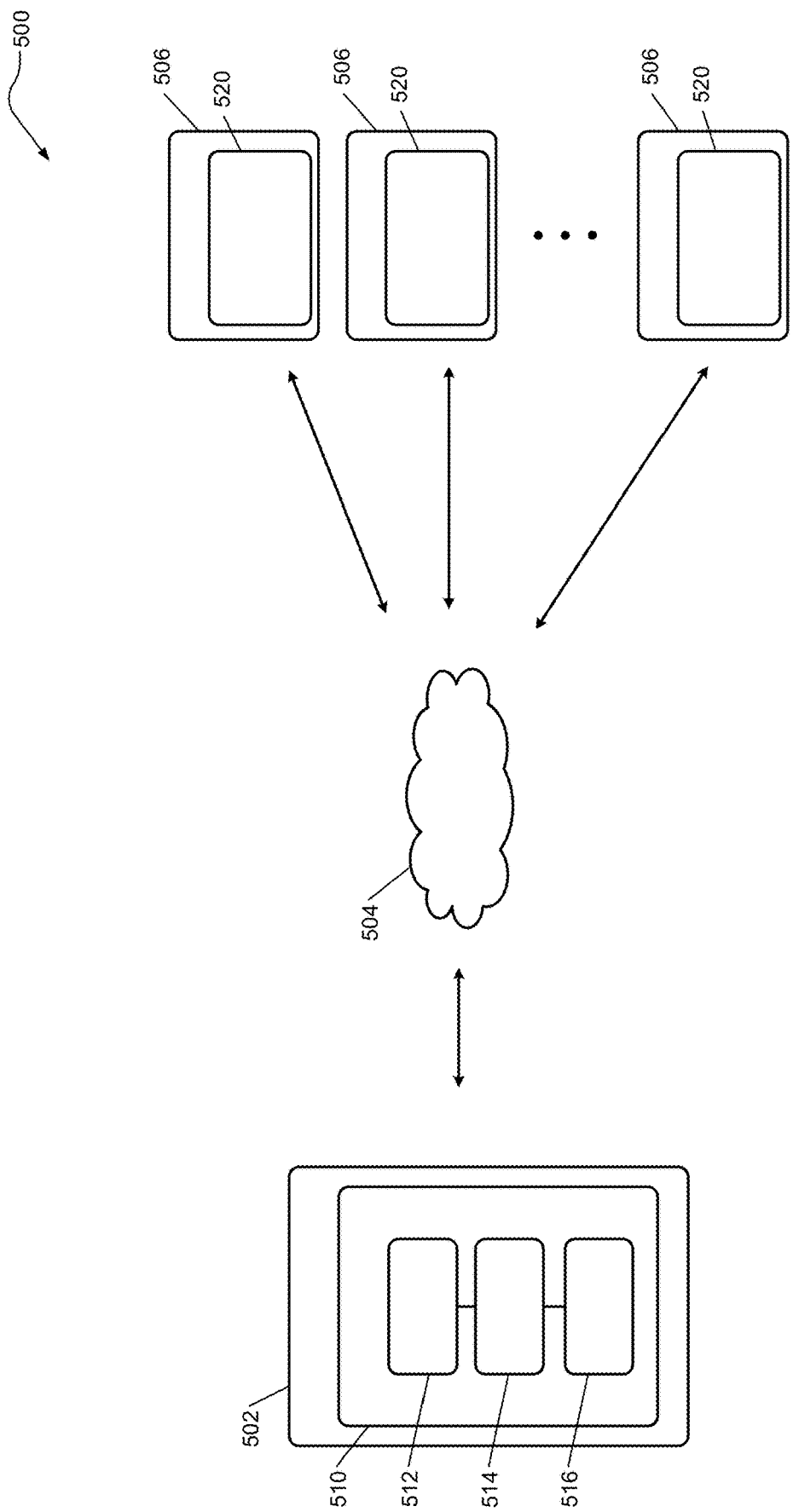
FIG. 5 is a functional block diagram of an example of an environment informing system providing environmental data directly to mobile devices in accordance with the present disclosure.

FIG. 5 shows an environment informing system 500 providing environmental data directly to mobile devices. The environment informing system 500 may include a central office 502, a distributed communications system 504 and mobile devices 506. The central office 502 may be similar to the central office 304 of FIG. 3 and include a monitoring station 510. The monitoring station 510 may include a control module 512, a transceiver 514 and a database and/or memory 516. The mobile devices 506 may be configured and operate similarly as the mobile devices 312 of FIG. 3. The mobile device 506 include environment awareness modules 520 that operate similarly as the environment awareness modules 204 and 350 of FIGS. 2-3.

Figure 6:
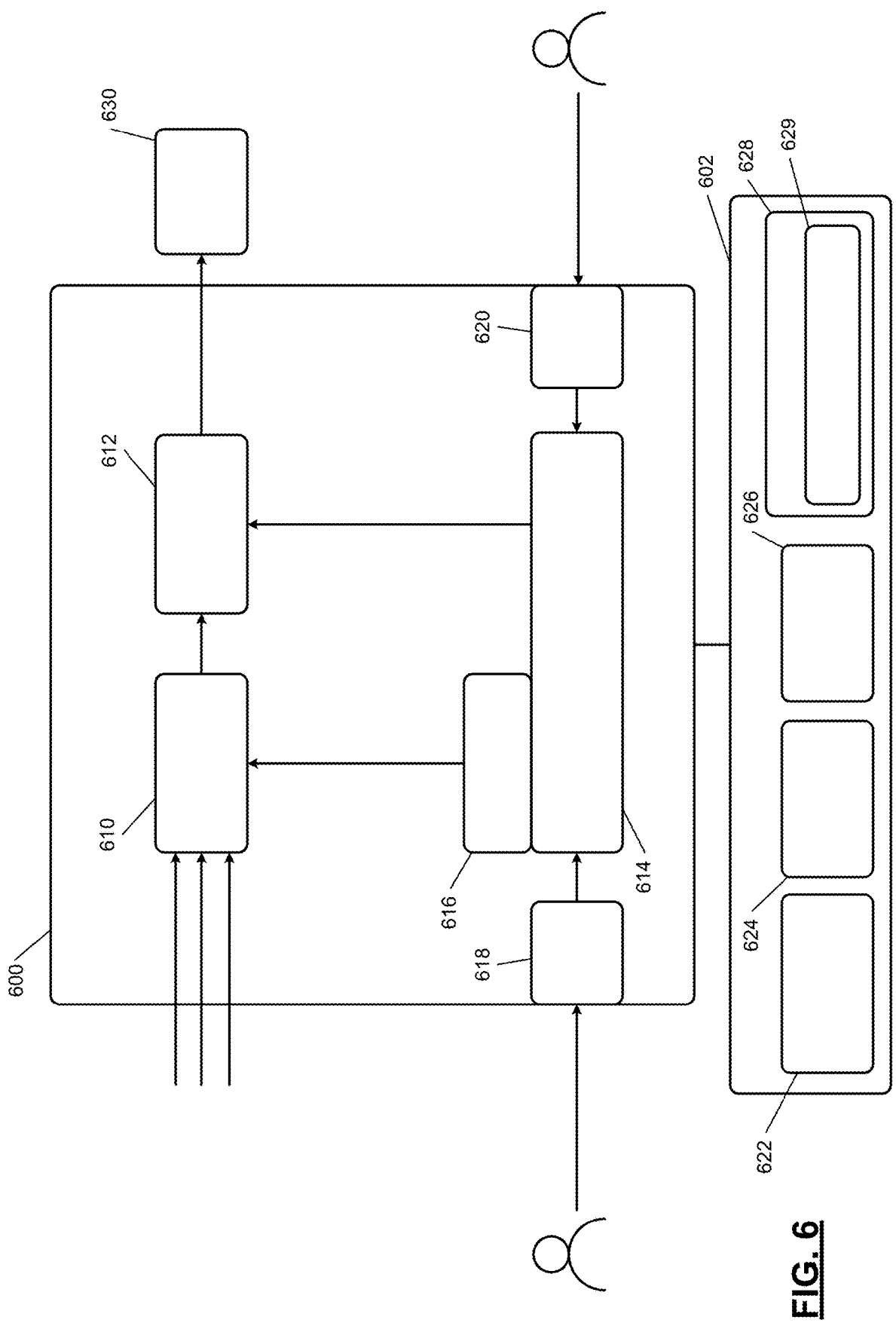
FIG. 6 is a functional block diagram of an example of an environment awareness module and memory in accordance with the present disclosure.

FIG. 6 shows an environment awareness module 600 and memory 602. The environment awareness module 600 may represent any of the other environment awareness modules disclosed herein include the environment awareness modules 204, 308, 350, 520 of FIGS. 2-5. The environment awareness module 600 may include a variable composition data extraction module 610, a composition compiler module 612, a composition configuration module 614, a mapping module 616, and one or more interfaces (two interfaces 618, 620 are shown). In one embodiment, the interfaces include one or more buses that are connected to other modules, sensors, memory, transceivers, and/or interfaces (e.g., a touchscreen, a keypad, a keyboard, a microphone, etc.). The memory 602 may store variable music and coded composition templates 622, environmental data 624, data/composition maps 626, user preferences 628, user selected environmental information and/or conditions to monitor 629. The environmental conditions may be external to or internal to a vehicle of which the user is an occupant.

The variable composition data extraction module 610 applies one of the data/composition maps 626 to convert environmental data into a format needed for the composition compiler module 612 to generate a music signal for playout via an audio system 630, such as one of the above-described audio systems.

The composition configuration module 614 receives inputs from a composer via the interface 618. The composer may upload a variable and coded music composition template, creates a variable and coded music composition template and/or modifies an existing variable and coded music composition template. One or more of the stored variable music composition templates 622 may have been uploaded via one or more composers. A variable and coded music composition template refers to a combination of musical composition and intelligently-modifiable elements in that composition that can be changed based on environmental data sources. For example, the variable and coded music composition template may include one or more compositions with variables that may be changed based on environmental data values received. The variables may be indicative of and/or used to change any of the music characteristics described herein, such as tempo, pitch, harmony, tone, volume, voices, melody, dissonance, consonance, motive, etc. Users can select one or more of the variable and coded music templates based on which the composition compiler module 612 creates music. The environmental data may include any data that represents certain environmental information and/or PoIs that the user has interest in hearing.

The user may input via the interface 620 the environmental information of interest. The user may also request that different compositions and/or tracks be played. The user may also input the user preferences 628, which may include any of the user preferences referred to herein including music genres (e.g., jazz, blues, rhythmic, rock, country, soul, dance, etc.), tempos, minimum and/or peak volumes, and/or other music preferences. A user may also indicate types of music that the user does not prefer. The preferences 628 may include the user selected environmental information and/or conditions to monitor, as shown in FIG. 6. An audio track may refer to real-time implemented music played for the user through the audio system 630.

The mapping module 616, although shown separate from the composition configuration module 614 may be integrated as part of the composition configuration module 614. The mapping module 616 generates a data-to-composition map based on which environmental data elements variables in the variable and coded music composition template that may be modified and set. The composition compiler module 612 uses a selected variable and coded music template and applies variable data extracted from the environment to create music. The variable composition data extraction module 610 may map environmental data received and/or a particular environmental situation detected to a particular composition. Baseline (or default) compositions may be selected for a standard (or default) set of situations and/or customized compositions may be created by a user and selected and used for the standard set of situations or for a customized (or user created) set of situations.

A user may select any combination of various parameters to customize the feel of music being generated, such as musical style, instrumentation (instrument selection), pitch mapping, time controls, harmony, etc. Certain types of compositions are more applicable to certain type of situations. For example, when tracking distance between a user (or vehicle of the user) and an object (e.g., another vehicle), a continuously changing melody may be appropriate, as opposed to an occasional ding. The melody may for example increase in tempo, the closer the user (or vehicle of the user) is to the object. This is, for example, substantially different than how a driver traditionally detects an oncoming vehicle via eyesight and use of mirrors, displays, and/or a vibration in a seat.

The variable and coded music template may be simple (not coded) or complex (coded). The following is an example of a coded template implementation. If sun intensity has values of 0-10, each sun intensity (or sun intensity integer) value may be associated with a certain range of pitch values. For example if the sun intensity is a first value, then pitch values of 11-40 are used. If the sun intensity value is a second value, then pitch values 41-100 are used. Then, at the composition compiler module 612, the environmental data may then be applied to the template and actual music instructions for generating music are created.

Figure 7:
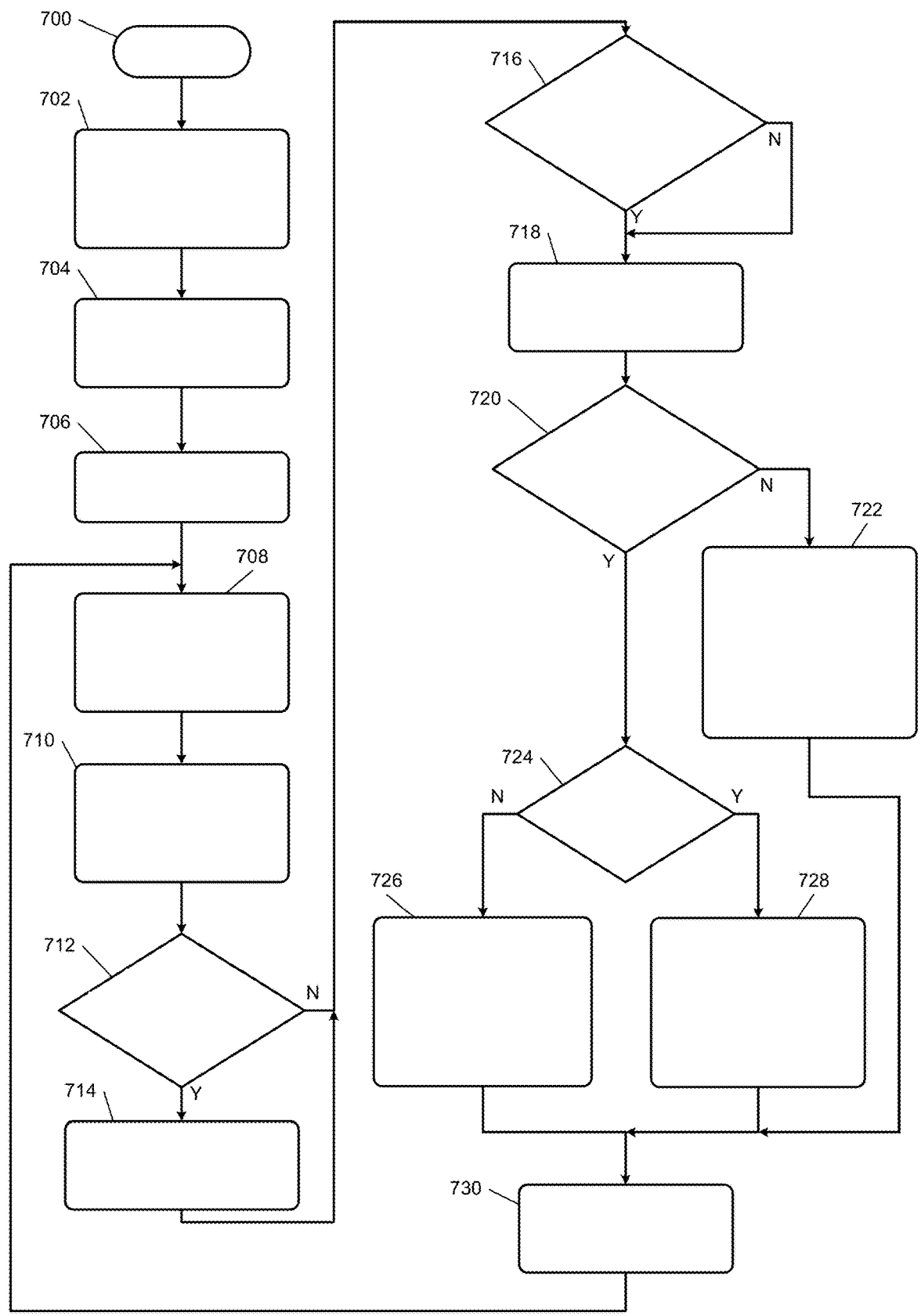
FIG. 7 illustrates a method of operating the environment awareness module of FIG. 6.

Operations of the modules 600, 610, 612, 614 and 616 are further described below with respect to the method of FIG. 7. The method of FIG. 7 is provided as an example, other similar methods may be implemented.

Although the following method is primarily described with respect to the embodiment of FIG. 6, the method is applicable to the embodiments of FIGS. 2-5. FIG. 7 shows a method of operating the environment awareness module of FIG. 6. The operations may be iteratively performed. The method may begin at 700. At 702, the composition configuration module 614 may receive and store variable and coded music composition templates in the memory 602.

At 704, the composition configuration module 614 may receive and store user preferences, user selected conditions to monitor, user selected environmental information to track and/or monitor, etc. As a few examples, a user may want to know distance to a particular destination, when the user is getting close to the particular destination, an impending change in weather, if a particular type of restaurant is close, state of flaps on a plane the user is piloting, whether a hazardous condition exists, etc.

At 706, the variable composition data extraction module 610 receives environmental data from one or more sources, at least some of which are described above. The variable composition data extraction module 610 may filter out data unrelated to the environmental information requested to be monitored by the user and/or other conditions being detected. In one embodiment, the environment awareness module 600 monitors for a set of default conditions in addition to the information and/or conditions requested to be monitored by the user.

At 708, the variable composition data extraction module 610 converts the environmental data to a format for the composition compiler module 612 based on a data-to-composition map received from the mapping module 616. Customized programming of the conversion and/or mapping may be implemented in software. As an example, the music generated may change as GIS data changes in time and in space. At 710, the composition compiler module 612 generates an audio signal that is played out by the audio system 630 as music for the user to listen to and hear aspects of the surrounding environment being reported to the user in the form of music. Initially, the composition compiler module 612 may generate an audio output based on a default or initial variable and coded music composition template. This may include automated generation of musical forms as well as reusing of canned musical forms from a known data source of pre-recorded music.

At 712, the composition configuration module 614 may determine if a request from the user has been received to change the stored preferences has been received. This may include updating, adding and/or removing preferences. If yes, operation 714 may be performed, otherwise operation 716 may be performed. At 714, the composition configuration module 614 may receive and store the preference changes.

At 716, the composition configuration module 614 may determine if a request from the user has been received to update, remove and/or add monitored conditions. If yes, operation 718 may be performed. At 718, may receive and store the update changes.

At 720, the composition configuration module 614 may determine whether the user has requested to change a currently played track. If not, operation 722 may be performed. If a change in the current track is requested, operation 724 may be performed. At 722, the composition configuration module 614 adjusts the current variable and coded composition template based on the user preferences and conditions to monitor.

At 724, the composition configuration module 614 may proceed to operation 726 if not operating in the manual selection mode and to operation 728 if operating in the manual selection mode. At 726, the composition configuration module 614 may automatically change the variable and coded composition template based on the user preferences and condition to monitor, which is then provided to the composition compiler module 612. At 728, the composition configuration module 614 allows a user to select and/or adjust (or customize) the variable and coded composition template, which is then provided to the composition compiler module 612.

At 730, the variable composition data extraction module 610 continues to receive environmental data from various sources. Operation 708 may be performed subsequent operation 730.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples provide audio as a means for a user to recognize aspects of an environment. The examples include representing attributes, features, and conditions associate with an environment surrounding a user as music. This is particularly helpful for a user that is sight impaired. A large amount of environmental data is able to be provided through music in an easy to recognize format. This allows a user to receive environmental information without requiring a user to divert the user's eyes from, for example, the road ahead, thereby improving safety of operating a vehicle and/or other forms of transportation (e.g., a bike). This is accomplished without need of a display or screen. The examples allow a user to select attributes of interest. The examples also allow the environment awareness module involved and/or the user to assign a music template and/or compositions for the attributes of interest.

The above-examples allow a user to detect various conditions via music. As a few examples, the above-described systems may allow a user to detect that: a user or corresponding vehicle is approaching black ice; it is going to rain; there is a traffic jam ahead; the vehicle the occupant is currently riding in is leaving the city limits; etc. A system may automatically select or the user may select one or more compositions and/or tracks of music for each condition. Different instrumental sounds may be used for different situations. As an example the playing of wind chimes and the volume and/or frequency of the sound generated may be used to represent wind intensity and speed. The music may be altered to track presence of inanimate objects (e.g., vehicles and non-vehicular objects) as well as animate objects (e.g., people and animals).

The examples allow a user to listen to the surroundings or "world" around the user in the form of music with various compositional elements representing certain aspects of the environment. At least some of the compositional elements may represent aspects that the user is interested in hearing about. The examples may be implemented while the user is walking on a sidewalk, riding in public transportation, renting a car, operating a form of transportation, etc. The music changes as the surrounding change.

The examples may include limiting the number of aspects and/or conditions at a time being indicated and/or the number of different and concurrently played out compositions and/or changing audio characteristics. As an example, the number of aspects and/or conditions may be limited to 3-5 and/or the number of different and concurrently played out compositions and/or changing audio characteristics may be limited to 3-5 to assure that the user is able to detect, recognize and if needed react to the one or more aspects and/or conditions being indicated. A single composition may be played out to indicate multiple aspects and/or conditions. The audio characteristics may include melodies, pitches, harmonies, volume, tempo, etc. A played out phrase may be built from figures, motifs and cells.

The examples include converting environmental data to music, not simply detecting if a condition exists and then creating an auditory sound. For example, a vehicle that detects closeness (or distance) of an object while backing up and then beeps to indicate that the distance between the vehicle and the object is decreasing is different than a vehicle that converts distance data to music including a melody that changes to indicate that the object is getting closer. As another example, the disclosed systems may be used to indicate via music to an operator of a first vehicle that a second vehicle is in a blind spot. The vehicle operator is able to detect the presence of the second vehicle and approximately how close the second vehicle is to the first vehicle by simply listening to the music and without turning and/or tilting the operator's head to see the first vehicle, look at a mirror, and/or look at a display of the first vehicle. The operator may be listening to a song and the song changes to indicate the approaching second vehicle. For example, the song may include a "whishing" sound (or a clashing of symbols) as part of the music and the whishing sound may get louder the closer the second vehicle becomes. The song being played out allows the operator to understand the surroundings with minimal distraction. The music played is designed to be adapted for real time awareness of changes in the surroundings and continuously played while system is enabled. Certain aspects may be continuously played out (such as changes in distance to a destination) while other aspects are played as parts of songs during respective periods of time. The music may be played as background music while allowing the user to hear, see and/or feel other traditional vehicle indicators.

The examples disclosed herein aid in lowering the cognitive load of a driver or pilot by providing auditory information and allowing for the amount of visual information to be decreased.

Figure 8:
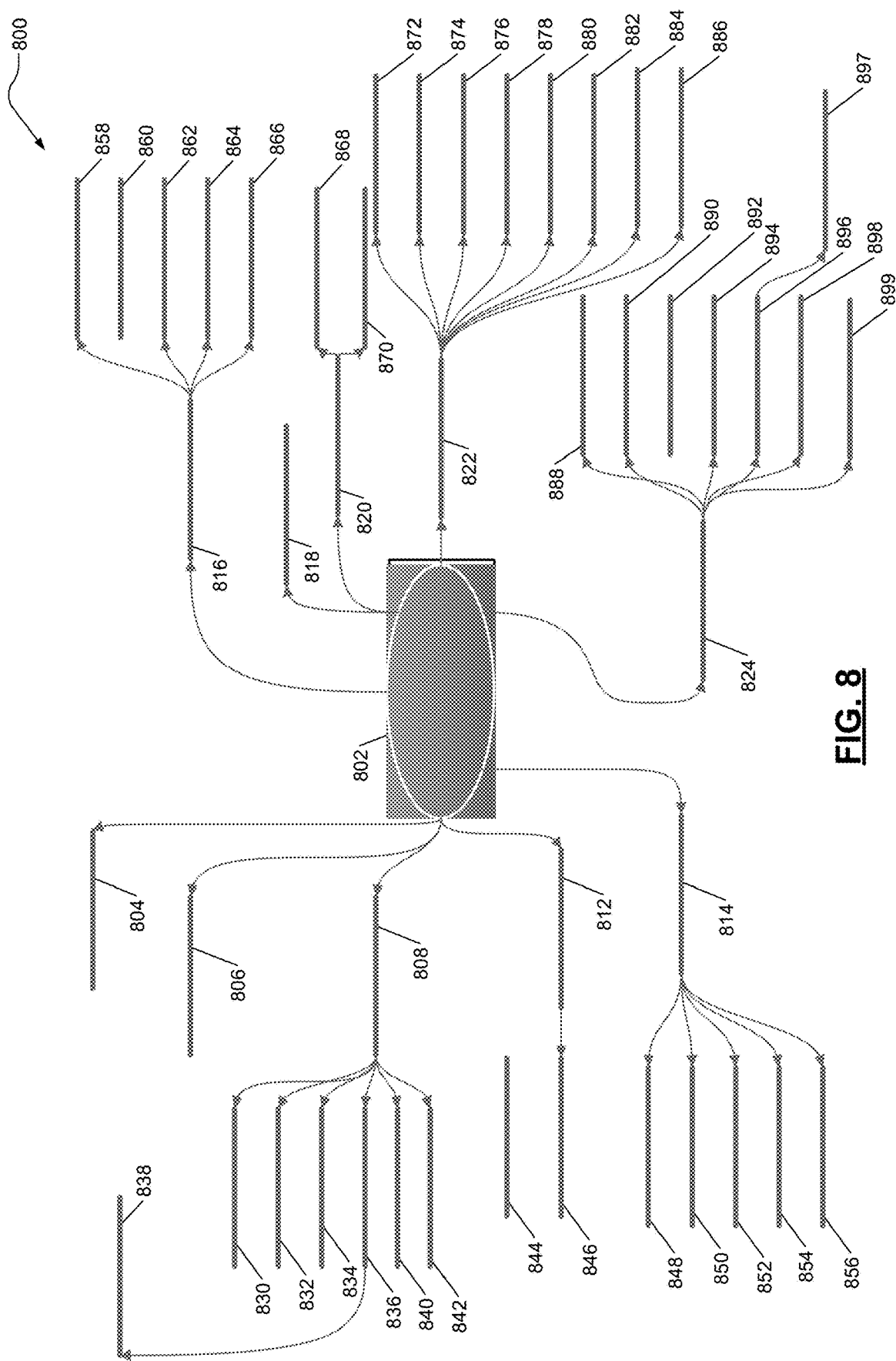
FIG. 8 is an example diagram illustrating features associated with musical representation of environmental data in accordance with the present disclosure.

FIG. 8 shows an example diagram 800 illustrating features associated with musical representation of environmental data 802 for the above-described systems, which may be implemented by any of the above-described environment awareness modules. The generated music may represent distances as scales represented by line 804, speed as changes in tempo represented by line 806, and changes in situations as tones represented by line 808. The music may include customization, represented by line 812, and/or be generated using various types of technology, represented by line 814. The music may represent different aspects and conditions using different musical vocabulary genres, represented by line 816. Different aspects and conditions may be represented as parts of a musical stream, represented as line item 818. New music may be created, represented as line 820. Different musical vocabulary may be used for different PoIs, represented as 822 and different musical techniques may be used, as represented by line 824.

The change in situations 808 may include change direction alerts 830, road alerts 832, traffic alerts 834, vehicle alerts 836 (e.g., distance from near-by vehicles 838), vehicle health 840 and weather alerts 842. The customization 812 may include musical genres 844 and aftermarket digital assets 846. The technologies 814 may include artificial intelligence (AI) for music styles 848, electronic music 850, fuzzy logic 852, a musical dictionary 854, and synthesizers 856. The musical vocabulary genres 816 may include classical 858, country 860, jazz 862, metal 864, and rhythm and blues 866. The new music 820 may include a human composer canvas 868 and an automatic composition 870. The musical vocabulary for PoIs may include a boundaries 872, cities 874, gas stations 876, lodging 878, food 880, PoIs 882, road conditions 884, and weather conditions 886. The musical technologies 824 may include after the beat/tempos

888, amplify a range of sounds and notes 890, changes in scales 892, changes in the phraseology 894, melodic structure 896 including swap melodies in an out of a stream 897, phrases indicating information 898, and removes a range of sounds and notes 899.

The user interface for the customization of the ingredients as shown in FIG. 6 may be extended to include other properties such as the algorithm to use for specific data streams such that the specific data streams are transformed into musical sound. Motifs and sounds may be played based on environmental data without having a background or ambient "song" being played in the background.

The environment awareness modules disclosed herein may be implemented in a server or in a portable device. The environment awareness modules may be implemented and deployed on a variety of computing platforms with different form factors. One such platform may be a telematics platform. The environment awareness modules may be implemented in a telematics module, such as that shown in FIGS. 3-4.

In one embodiment, a database of pre-recorded musical pieces (single instruments, multiple instruments, or orchestral pieces, etc.) is provided based on detected environmental data and/or conditions instead of automatic generation of music based on the environmental data (or signals) and/or conditions. The system will then enable the user to perform the mapping of the pre-recorded music to the signals (environmental data sources).

The above examples may include more complex musical forms to indicate spatial relationships among PoIs and/or other relationships. Some example relationships include connection relationships, adjacency relationships, containment relationships, overlap relationships, proximity relationships, congruency relationships, elevation relationships, and parallel relationships. An example of the connection relationship is Water Street connects with 18th Ave. An example of an adjacency relationship is the city park is adjacent to the university. An example of a containment relationship is the building footprints are contained within the parcel boundary. An example of an overlap relationship is the railway crosses the freeway. An example of a proximity relationship is the courthouse is near the State Capitol. An example of a congruency relationship is the city park is congruent to the historic site polygon. An example of an elevation relationship is the State Capitol is uphill from the water. An example of a parallel relationship is the bus route follows along the street network.

The above examples may include playing special customizable musical chimes or phrases to indicate—based on a trip map a left turn, a right turn, a sharp left turn, a sharp right turn, stop immediately, stop signal ahead, school crossing ahead, a railroad crossing ahead, yield, other types of interactions ahead, and roundabout ahead and which exist to take. The environment awareness modules may execute a training game to teach people to learn which sounds (musical phrases) correspond to which rules and which locations. Musical representation of structured and non-structured data enables musically representing GIS and other environmental information in such a way as to reduce cognitive load on the driver in a pleasing manner.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An environment awareness system comprising:
    a memory configured to store environmental data, one or more music composition templates, and one or more maps, wherein the environmental data is indicative of at least one of a state, condition, or change in an environment in which the environment awareness system is located;
    a first module configured to receive and store the environmental data in the memory; and
    a second module configured to
        based on the one or more music composition templates and the one or more maps, convert the environmental data to a music signal including modifying variables in the one or more music composition templates based on the environmental data, and
        based on the music signal, play out a musical composition via an audio system to audibly indicate the at least one of the state, condition, or change in the environment,
    wherein the second module is configured to at least one of i) change the musical composition differently for different points of interest, ii) change the musical composition based on a distance to a selected one of the different points of interest, iii) change the musical composition to play different musical instruments for each of the different points of interest, and iv) change the musical composition to vary an amount of musical mismatch from a user preference based on closeness that the environmental data is to a selected one of the different points of interest, wherein the different points of interest are destinations selected by a user.

2. The system of claim 1, further comprising the audio system, wherein:
    the audio system is configured to receive the music signal and play out the musical composition; and
    the musical composition includes instrumental music.

3. The system of claim 2, wherein the musical composition further includes a vocal part.

4. The system of claim 1, wherein:
    the memory is configured to store user preferences; and
    the second module is configured to, based on the user preferences, generate or modify at least one of the one or more music composition templates or the one or more maps.

5. The system of claim 1, further comprising an interface configured to receive a user input,
    wherein the second module is configured to, based on the user input, select the one or more music composition templates based on a user preference indicated by the user input or an instruction included in the user input to change a track of the musical composition.

6. The system of claim 1, wherein the second module is configured to generate the music signal to include different musical phrases for the different points of interest.

7. The system of claim 1, wherein the second module is configured to generate the music signal to include different musical phrases for different environmental conditions.

8. The system of claim 1, wherein the second module is configured to generate the music signal to include motives to musically indicate distances to one or more of the different points of interest.

9. The system of claim 1, wherein the second module is configured to generate the music signal to include different musical compositions of the different musical instruments to musically indicate respectively the different points of interest.

10. The system of claim 1, wherein the second module is configured to generate the music signal to include sound effects to musically indicate a change in an environmental state or condition.

11. The system of claim 1, wherein the second module is configured to generate the music signal to include a dissonant chord to indicate musically a hazardous condition.

12. The system of claim 1, wherein the second module is configured to i) generate the music signal to include a harmony preference of the user when a current state or condition matches a user request and ii) generate the music signal to include a tension or a dissonance to indicate musically that the current state or condition does not match the user request.

13. The system of claim 1, wherein:
the second module is configured to receive a user input and adjust parameters of the music signal based on the user input; and
the parameters include at least one of musical style parameters, instrumentation parameters, pitch mapping parameters, time control parameters and harmony parameters.

14. The system of claim 1, wherein the second module is configured to adjust at least one of tempo, pitch, volume, melody, or harmony of the music signal based on changes in the environmental data.

15. The system of claim 1, further comprising one or more sensors, wherein the environmental data is received from the one or more sensors.

16. The system of claim 1, wherein the environmental data is received from a wireless network or a distributed network.

17. The system of claim 1, further comprising a transceiver configured to transmit the environmental data from a vehicle to a mobile network device, wherein:
the memory is implemented in the vehicle; and
the second module is implemented in the mobile network device.

18. The system of claim 1, further comprising a transceiver configured to transmit the music signal from a vehicle to a mobile network device, wherein:
the memory and the second module are implemented in the vehicle; and
the audio system is implemented in or connected to the mobile network device.

19. A mobile device comprising:
the system of claim 1; and
a transceiver configured to receive the environmental data from at least one of i) a sensor of the mobile device, ii) a vehicle, or iii) a distributed network,
wherein the mobile device is a mobile phone, a portable computer, or a wearable device.

20. A vehicle comprising:
the system of claim 1; and
the audio system configured to play out music within the vehicle based on the music signal.

* * * * *